(12) United States Patent
Hamaguchi et al.

(10) Patent No.: US 8,812,192 B2
(45) Date of Patent: Aug. 19, 2014

(54) LANE DEPARTURE PREVENTION SYSTEM

(75) Inventors: Youji Hamaguchi, Zama (JP); Kou Satou, Sagamihara (JP); Yasuhisa Hayakawa, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 1580 days.

(21) Appl. No.: 11/777,401

(22) Filed: Jul. 13, 2007

(65) Prior Publication Data
US 2008/0021613 A1 Jan. 24, 2008

(30) Foreign Application Priority Data
Jul. 18, 2006 (JP) .................................. 2006-195769

(51) Int. Cl.
| | | |
|---|---|---|
| A01B 69/00 | (2006.01) | |
| B62D 6/00 | (2006.01) | |
| B62D 11/00 | (2006.01) | |
| B62D 12/00 | (2006.01) | |
| B63G 8/20 | (2006.01) | |
| B63H 25/04 | (2006.01) | |
| G05D 1/00 | (2006.01) | |
| G06F 7/00 | (2006.01) | |
| G06F 17/00 | (2006.01) | |
| G06F 19/00 | (2011.01) | |
| G05D 1/02 | (2006.01) | |
| G06F 17/10 | (2006.01) | |
| B60W 40/114 | (2012.01) | |
| B60W 40/112 | (2012.01) | |
| B60W 40/11 | (2012.01) | |
| B60T 8/1755 | (2006.01) | |
| B60W 50/14 | (2012.01) | |
| B60W 30/12 | (2006.01) | |
| B60W 40/08 | (2012.01) | |

(52) U.S. Cl.
CPC .......... *B60T 8/17557* (2013.01); *B60W 40/114* (2013.01); *B60W 40/112* (2013.01); *B60W 40/11* (2013.01); *B60W 2040/0818* (2013.01); *B60T 2201/086* (2013.01); *B60T 2201/08* (2013.01); *B60W 50/14* (2013.01); *B60W 30/12* (2013.01)
USPC ............................................ 701/41; 701/300

(58) Field of Classification Search
USPC .................................................... 701/41, 300
See application file for complete search history.

(56) References Cited

U.S. PATENT DOCUMENTS 5,925,082 A * 7/1999 Shimizu et al. ................. 701/41
5,941,334 A * 8/1999 Inagaki .......................... 180/242
(Continued)

FOREIGN PATENT DOCUMENTS

| EP | 1426906 A1 | 6/2004 |
| JP | 2003-112540 A | 4/2003 |

*Primary Examiner* — Imran Mustafa
(74) *Attorney, Agent, or Firm* — Global IP Counselors, LLP

(57) ABSTRACT

A lane departure prevention system is provided with a lane departure tendency detection section, a yaw moment calculating section and a yaw moment control section. The lane departure tendency detection section detects a degree of a lane departure tendency of a host vehicle exhibiting a tendency of departing from its driving lane. The yaw moment calculating section calculates a base yaw moment to be applied to the host vehicle based on the degree of the lane departure tendency. The yaw moment control section applies the base yaw moment calculated by the yaw moment calculating section to the host vehicle when the base yaw moment is equal to or larger than a first prescribed minimum yaw moment, which is greater than zero, and applies the first prescribed minimum yaw moment to the host vehicle if the base yaw moment is smaller than the first prescribed minimum yaw moment.

7 Claims, 5 Drawing Sheets

(56) References Cited

U.S. PATENT DOCUMENTS

| | | | |
|---|---|---|---|
| 7,206,684 B2 * | 4/2007 | Takeda | 701/70 |
| 7,236,884 B2 * | 6/2007 | Matsumoto et al. | 701/300 |
| 2004/0186651 A1 * | 9/2004 | Tange et al. | 701/96 |
| 2004/0215393 A1 * | 10/2004 | Matsumoto et al. | 701/300 |

* cited by examiner

LANE DEPARTURE PREVENTION SYSTEM

CROSS-REFERENCE TO RELATED APPLICATIONS

This application claims priority to Japanese Patent Application No. 2006-195769, filed on Jul. 18, 2006. The entire disclosure of Japanese Patent Application No. 2006-195769 is hereby incorporated herein by reference.

BACKGROUND OF THE INVENTION

1. Field of the Invention

The present invention generally relates to a lane departure prevention system configured to prevent a vehicle from departing from a lane in which the host vehicle is traveling when the host vehicle exhibits behavior (i.e., a tendency) indicating that the host vehicle will likely depart from the lane. More specifically, the present invention relates to a lane departure prevention system that informs the driver that lane departure prevention control is being executed.

2. Background Information

Several lane departure prevention systems have been proposed for imparting a yaw moment to a host vehicle for avoiding the host vehicle from deviating from the driving lane. One example of a lane departure prevention system is disclosed in Japanese Laid-Open Patent Publication No. 2003-112540. In this publication, a lane departure prevention control applies a yaw moment to a vehicle by imposing a braking force differential on the left and right wheels of the host vehicle when there is a possibility that the host vehicle will depart from a lane in which the host vehicle is traveling. Additionally, through the host vehicle behavior, the control notifies the driver of the possibility that the host vehicle will depart from the lane. The yaw moment applied to the host vehicle is set to a value corresponding to the yaw angle of the host vehicle with respect to the lane in which the host vehicle is traveling.

In view of the above, it will be apparent to those skilled in the art from this disclosure that there exists a need for an improved lane departure prevention system. This invention addresses this need in the art as well as other needs, which will become apparent to those skilled in the art from this disclosure.

SUMMARY OF THE INVENTION

It has been discovered that in the control described in Japanese Laid-Open Patent Publication No. 2003-112540, when the yaw angle is small, the yaw moment applied to the host vehicle is small because the yaw moment applied to the host vehicle is set to a value corresponding to the yaw angle. Consequently, even if there is a possibility that the host vehicle will depart from the lane, if the yaw angle is small, then the change in the host vehicle behavior resulting from the lane departure prevention control will be small. Accordingly, it is possible that the lane departure prevention control could end without being noticed by the driver. In short, the effectiveness of the control with respect to notifying the driver of the possibility of lane departure is diminished.

One object of the present invention is to increase the effectiveness with which such a control notifies the driver of the possibility of lane departure.

In order to achieve the aforementioned object, a lane departure prevention system in accordance with the present invention is provided that basically comprises a lane departure tendency detection section, a yaw moment calculating section and a yaw moment control section. The lane departure tendency detection section is configured to detect a degree of a lane departure tendency of a host vehicle exhibiting a tendency of departing from its driving lane. The yaw moment calculating section is configured to calculate a base yaw moment to be applied to the host vehicle based on the degree of the lane departure tendency determined by the lane departure tendency detection section. The yaw moment control section configured to apply the base yaw moment calculated by the yaw moment calculating section to the host vehicle when the base yaw moment is equal to or larger than a first prescribed minimum yaw moment, which is greater than zero, and to apply the first prescribed minimum yaw moment to the host vehicle if the base yaw moment is smaller than the first prescribed minimum yaw moment.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
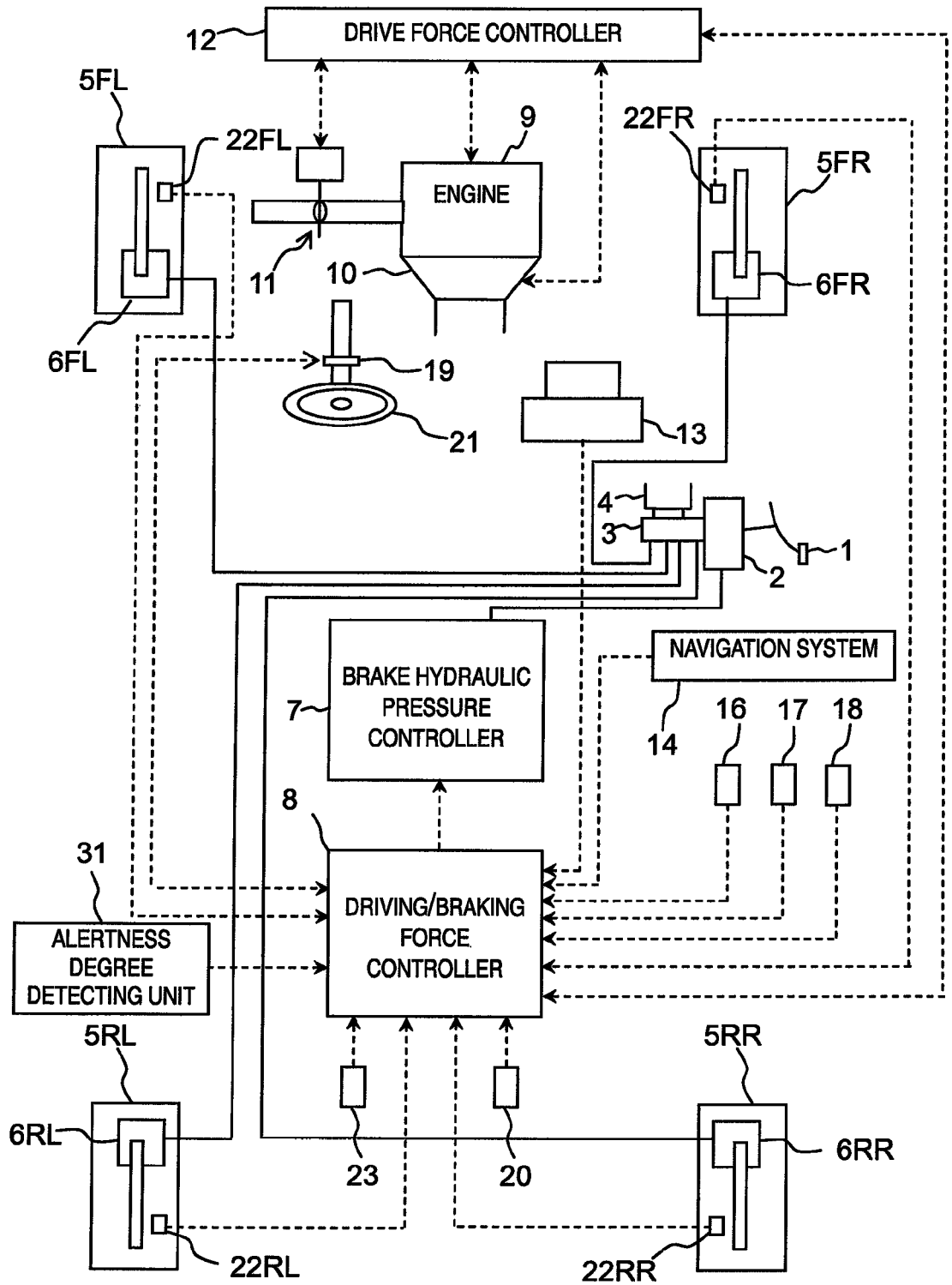
FIG. 1 is a schematic structural diagram of a vehicle equipped with a lane departure prevention system in accordance an illustrated embodiment of the present invention.

Referring initially to FIG. 1, a rear-wheel drive vehicle is schematically illustrated in accordance with a first embodiment of the present invention. This embodiment involves a rear-wheel drive vehicle equipped with a lane departure prevention system. The rear-wheel drive vehicle is equipped with an automatic transmission, a conventional differential gear, and a brake system that is capable of controlling the braking force applied to each of the wheels (left, right, front and rear) independently.

As shown in FIG. 1, the host vehicle is basically equipped with a brake pedal 1, a booster 2, a master cylinder 3, a reservoir 4, a pair of front wheels 5FL and 5FR, a pair of rear wheels 5RL and 5RR, a pair of front wheel cylinders 6FL and 6FR, a pair of rear wheel cylinders 6RL and 6RR, a brake hydraulic pressure controller 7, a driving/braking force controller 8, an internal combustion engine 9, an automatic transmission 10, a throttle valve 11, a drive torque controller 12, an imaging unit 13, a navigation system 14, a radar device 16, a master cylinder pressure sensor 17, an accelerator pedal position sensor or throttle aperture opening sensor 18, a steering angle sensor 19, a turn signal switch 20, a steering wheel 21, a pair of front wheel velocity sensors 22FL to 22FR, a pair of rear wheel velocity sensors 22RL to 22RR and a road surface friction coefficient detecting device 23. This host vehicle is also preferably equipped with a driver alertness detection unit 31.

Brake hydraulic pressure boosted by the master cylinder 3 is ordinarily supplied to the wheel cylinders 6FL to 6RR of the wheels 5FL to 5RR according to how far the driver depresses the brake pedal 1. Also, the brake hydraulic pressure controller 7 is interposed between the master cylinder 3 and the wheel cylinders 6FL to 6RR, so that the brake hydraulic pressure of the wheel cylinders 6FL to 6RR can be individually controlled by this brake hydraulic pressure controller 7. Thus, the wheel cylinders 6FL to 6RR, the brake hydraulic pressure controller 7, the driving/braking force controller 8 all form part of a braking apparatus that allows independent control of braking force for the front and rear wheels and the left and right wheels.

The brake hydraulic pressure controller 7 is preferably configured and arranged, for example, to carry out anti-skid control and traction control. Although the brake hydraulic pressure controller 7 independently controls the braking hydraulic pressure of the wheel cylinders 6FL to 6RR, the brake hydraulic pressure controller 7 also controls the brake hydraulic pressure in accordance with a brake hydraulic pressure command value when the brake hydraulic pressure command value is input from the driving/braking force controller 8 (described below). The brake fluid pressure controller 7 includes, for example, an actuator arranged in the fluid pressure supply system. One example of an actuator is a proportional solenoid valve capable of controlling the brake fluid pressure of each wheel cylinder to any desired value.

The controller 8 preferably includes a microcomputer with a lane departure prevention control program that controls the wheel cylinders 6FL, 6FR, 6RL and 6RR to apply a yaw moment to the host vehicle as discussed below. The controller 8 can also include other conventional components such as an input interface circuit, an output interface circuit, and storage devices such as a ROM (Read Only Memory) device and a RAM (Random Access Memory) device. The memory circuit stores processing results and control programs such as ones for controlling the braking control operations that are run by the processor circuit. The controller 8 is operatively coupled to the above mentioned sensors in a conventional manner. The internal RAM of the controller 8 stores statuses of operational flags and various control data. The internal ROM of the controller 8 stores the programs and predetermined variables for various operations. The controller 8 is capable of selectively controlling any number of the components of the host vehicle as needed and/or desired. It will be apparent to those skilled in the art from this disclosure that the precise structure and algorithms for the controller 8 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The drive torque controller 12 controls the drive torque delivered to the drive wheels, i.e., the rear wheels 5RL and 5RR, by controlling the operating state of an engine 9, the selected gear ratio of the automatic transmission 10, and the opening degree of a throttle valve 11. The drive torque controller 12 controls the operating state of the engine 9 by controlling the fuel injection amount and ignition timing while simultaneously controlling the throttle opening degree. The drive torque controller 12 sends the value of a drive torque Tw used for drive torque control to the braking/driving force controller 8. Although the drive torque controller 12 can control the drive torque of the rear wheels 5RL and 5RR independently, the drive torque controller 12 also controls the drive torque in accordance with a drive torque command value received from the braking/driving force controller 8.

The imaging unit 13 has an image processing capability, serves to detect the position of the host vehicle within the lane in which the host vehicle is traveling in order to detect the lane departure tendency of the host vehicle. The imaging unit 13 comprises, for example, a monocular CCD (charge coupled device) camera. The imaging unit 13 is mounted on a frontward portion of the host vehicle and arranged to photograph a region in front of the host vehicle. The imaging unit 13 detects a white line or other lane marker in the photographed image and detects the lane based on the detected lane marker. Based on the detected lane, the imaging unit 13 calculates the angle (yaw angle) $\Phi$ between the lane in which the host vehicle is traveling and the longitudinal axis of the host vehicle, the lateral displacement X of the host vehicle from the middle of the lane, and the curvature $\beta$ of the lane. The imaging unit 13 sends the calculated yaw angle $\Phi$, lateral displacement X, and lane curvature $\beta$ to the braking/driving force controller 8.

The invention is not limited to detecting the lane marker using image processing. For example, the lane marker could be detected using a plurality of infrared sensors provided on a frontward portion of the host vehicle and the lane could be detected based on the detection results obtained from the infrared sensors.

Furthermore, the present invention is not limited to detecting the lane based on a white line. When a white line (lane marker) for recognizing the lane is not available on the road, it is possible to estimate a traveling path suitable for the host vehicle to travel on or a traveling path along which the driver should drive the host vehicle based on information regarding the road shape and the surrounding environment obtained from image processing or from various sensors and to treat the estimated traveling path as a lane. For example, if the road does not have a white line and the land on both sides of the road drops off in the manner of a cliff, the asphalt portion of the road can be detected as the lane in which the host vehicle is traveling. Similarly, if a guard rail or a curb exists, the traveling lane can be determined accordingly. Additionally, the lane curvature $\beta$ can be calculated based on the steering angle $\delta$ of the steering wheel 21 instead of using image processing.

The navigation system 14 is configured to detect the longitudinal acceleration Yg of the host vehicle, the lateral acceleration Xg of the host vehicle, and the yaw rate $\Phi'$ of the host vehicle. The navigation system 14 sends the detected longitudinal acceleration Yg, lateral acceleration Xg, and yaw rate $\Phi'$ (=d$\Phi$/dt) to the braking/driving force controller 8. The navigation system 14 also sends road information to the braking/driving force controller 8. The road information includes such information as the number of lanes of the road and road type identification information indicating whether the road is a highway or a local road or street. It is also acceptable to detect each of these values using dedicated sensors. In other words, it is acceptable to detect the longitudinal acceleration Yg and lateral acceleration Xg with an acceleration sensor and detect the yaw rate $\Phi'$ with a yaw rate sensor.

The radar device 16 measures such quantities as the distance between the host vehicle and a preceding obstacle by sweeping a laser beam across a region in front of the host vehicle and detecting light that is reflected from the preceding obstacle. The radar device 16 sends information regarding the position of the obstacle to the braking/driving force controller 8. The detection results obtained from the radar device 16 are used in the computer processing executed in order to accomplish such controls as following distance control (cruise control) and collision speed reducing brake control.

The master cylinder pressure sensor 17 of this embodiment serves to detect the output pressure of the master cylinder 3 (i.e., the master cylinder fluid pressures Pmf and Pmr). The accelerator pedal position sensor 18 of this embodiment serves to detect the depression amount of the accelerator pedal (i.e., the throttle opening degree θt). The steering angle sensor 19 of this embodiment serves to detect the angle δ to which the steering wheel 21 is turned (i.e., the steering angle). The directional switch 20 (turn signal switch) of this embodiment serves to detect the directional operation of a turn signal device. The wheel speed sensors 22FL to 22RR of this embodiment serves to detect the wheel speeds Vwi (i=fl, fr, rl, rr) (i.e., the rotational speeds) of the wheels 5FL to 5RR. Detection signals from each of these sensors are fed to the braking/driving force controller 8.

Regarding detected running state values that have directionality in the leftward and rightward directions of the host vehicle, the rightward direction is indicated with a positive value and the leftward direction is indicated with a negative value. Thus, the yaw rate $\Phi'$, the lateral acceleration Xg, and the yaw angle $\Phi$ are each positive when the host vehicle is turning to the right, and the lateral displacement X is positive when the host vehicle is offset to the right from the middle of the lane. The longitudinal acceleration Yg is positive when the host vehicle is accelerating and negative when the host vehicle is decelerating.

The processing executed by the braking/driving force controller 8 will now be explained with reference to FIG. 2. These computational processing steps executed by the braking/driving force controller 8 constitute a lane departure prevention system of this illustrated embodiment.

Figure 2:
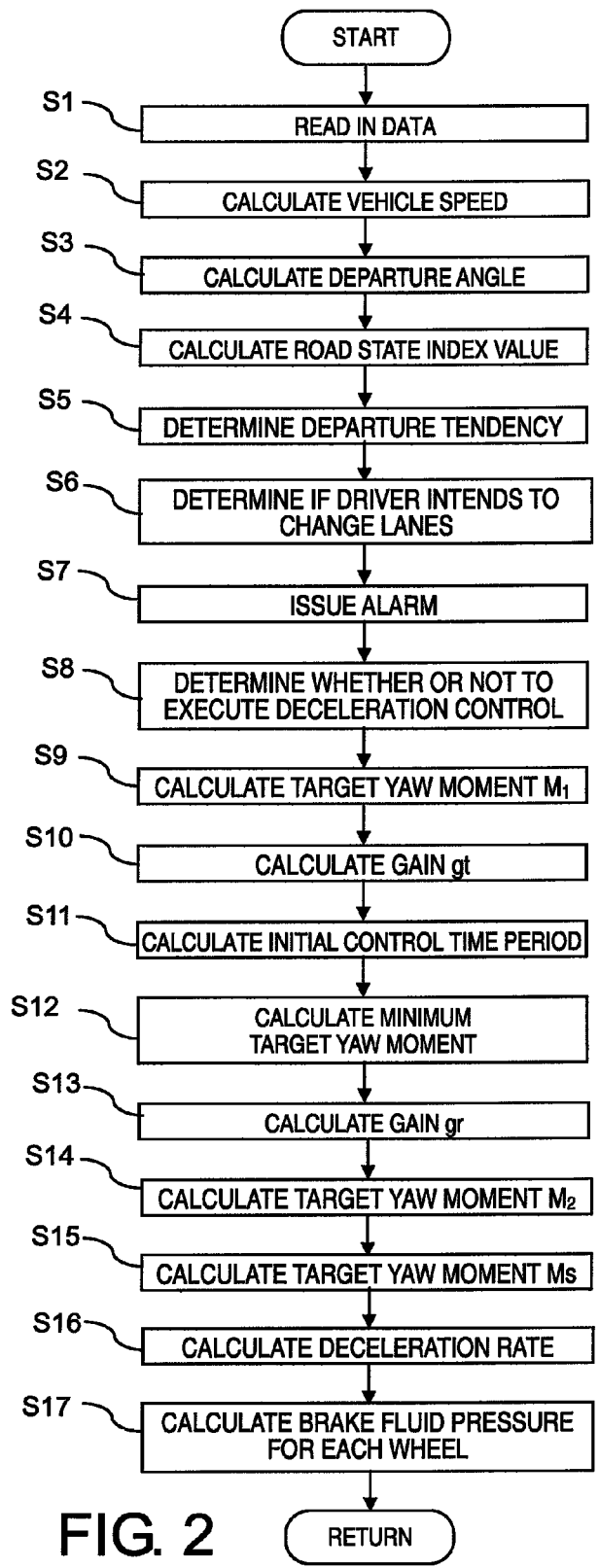
FIG. 2 is a flowchart showing the processing executed by a controller of the vehicle lane departure prevention system in accordance with the illustrated embodiment.

FIG. 2 is a flowchart showing the computational processing steps executed by the braking/driving force controller 8. The computational processing shown in FIG. 2 is executed once per prescribed sampling time period ΔT (e.g., 10 msec) using an interrupt timer. Although the flowchart shown in FIG. 2 does not include communication processing steps, information obtained from the computational processing steps is updated/stored in a memory device as necessary and required information is read from the memory device as necessary.

As shown in FIG. 2, in step S1 the braking/driving force controller 8 reads various data from the sensors, controllers, and controllers. More specifically, the braking/driving force controller 8 reads the road surface friction coefficient i detected by a road surface friction coefficient detecting device 23. The braking/driving force controller 8 also reads the longitudinal acceleration Yg, the lateral acceleration Xg, the yaw rate $\Phi'$, and the road information detected by the navigation system 14. The braking/driving force controller 8 also reads the wheel speeds Vwi, the steering angle δ, the throttle opening degree θt, and the master cylinder fluid pressures Pmf and Pmr detected by the respective sensors. The braking/driving force controller 8 also reads the directional switch signal from sensor 20. The braking/driving force controller 8 also reads the drive torque Tw from the drive torque controller 12. The braking/driving force controller 8 also reads the yaw angle $\Phi$, the lateral displacement X (X0), and the lane curvature β from the imaging unit 13.

In step S2, the braking/driving force controller 8 calculates the host vehicle speed V. More specifically, the braking/driving force controller 8 calculates the host vehicle speed V using the equation (1) below based on the wheel speeds Vwi read in step S1.

For front wheel drive: $V=(Vwrl+Vwrr)/2$

For rear wheel drive: $V=(Vwfl+Vwfr)/2$ \hfill (1)

In the equations, the terms Vwfl and Vwfr are the wheel speeds of the left and right front wheels and the terms Vwrl and Vwrr are the wheels speeds of the left and right rear wheels. In short, the equation (1) calculates the host vehicle speed as the average value of the wheel speeds of the driven wheels (non-drive wheels). In this embodiment, the host vehicle is a rear-wheel drive vehicle and, thus, the latter equation is used to calculate the host vehicle speed V based on the wheel speeds of the front wheels.

The host vehicle speed V is preferable calculated in this manner when the host vehicle is traveling normally. When, for example, ABS (anti-lock brake system) control is being executed, the estimated vehicle body speed estimated for the ABS control is used as the host vehicle speed V. It is also acceptable to use a value used as navigation information by the navigation system 14 as the host vehicle speed V.

In step S3, the braking/driving force controller 8 calculates a departure yaw angle $\Phi t$ of the host vehicle with respect to the lane in which the host vehicle is traveling using the equation (2) shown below based on the yaw angle $\Phi$ and the lane curvature β obtained in step S1.

$\Phi t = \Phi + \beta$ \hfill (2)

In step S4, the braking/driving force controller 8 calculates a road state index value N indicating the roughness of the road (degree of roughness of the road surface) using the equation (3) shown below.

$N = f_1(\Phi', \Phi 0')$ \hfill (3)

In the equation above, the function f1 serves to calculate a derivative value of the yaw rate $\Phi'$, where the yaw rate $\Phi'$ at each processing timing (control cycle) is used as a sampled value and $\Phi 0'$ is a sample average. In other words, it is assumed that changes in the yaw rate $\Phi'$ are closely related to the roughness of the road and a road state index value N indicating the roughness of the road is estimated based on a derivative of the yaw rate $\Phi'$. More specifically, the larger the derivative value is, the larger (higher) the roughness degree of the road is and the larger the road state index value N becomes. Thus, step S4 constitutes a surface roughness detecting section that is configured to detect a roughness degree of a road on which the host vehicle is traveling.

In step S5, the braking/driving force controller 8 determines the lane departure tendency. More specifically, the braking/driving force controller 8 calculates an estimated future lateral displacement Xs (see FIG. 3) using the equation (4) shown below based on the yaw angle Φ, the lane curvature β, and current the lateral displacement X0 of the host vehicle obtained in step S1 and the host vehicle speed V obtained in step S2.

$$Xs = Tt \times V \times (\Phi + Tt \times V \times \beta) + X0 \quad (4)$$

In the equation above, term Tt is a headway time for calculating a look ahead distance and the product of the headway time Tt and the host vehicle speed V corresponds to the look ahead distance. Thus, the estimated lateral displacement Xs is an estimate value of what the lateral displacement of the host vehicle from the middle of the lane will be after the headway time Tt has elapsed.

Based on the equation (4), the estimated lateral displacement Xs increases as the yaw angle Φ increases if it is assumed that only the yaw angle Φ varies.

The braking/driving force controller 8 determines the lane departure tendency by comparing the estimated lateral displacement Xs to a prescribed departure tendency determination threshold value (lateral displacement limit distance) XL. The departure tendency determination threshold value $X_L$ is determined experimentally or by some other method and is a value at which it can generally be assumed that the host vehicle is in a lane departure tendency. The departure tendency determination threshold value $X_L$ is, for example, a value indicating the position of a boundary line of the road and is calculated, for example, in accordance with the equation (5) shown below (see FIG. 3).

$$X_L = (L-H)/2 \quad (5)$$

In the equation above, the term L is the lane width and the term H is the width of the host vehicle. The lane width L is obtained by the imaging unit 13 processing the photographed image. It is also acceptable to obtain the position of the host vehicle from the navigation system 14 and to obtain the lane width 1 from the map data of the navigation system 14.

Figure 3:
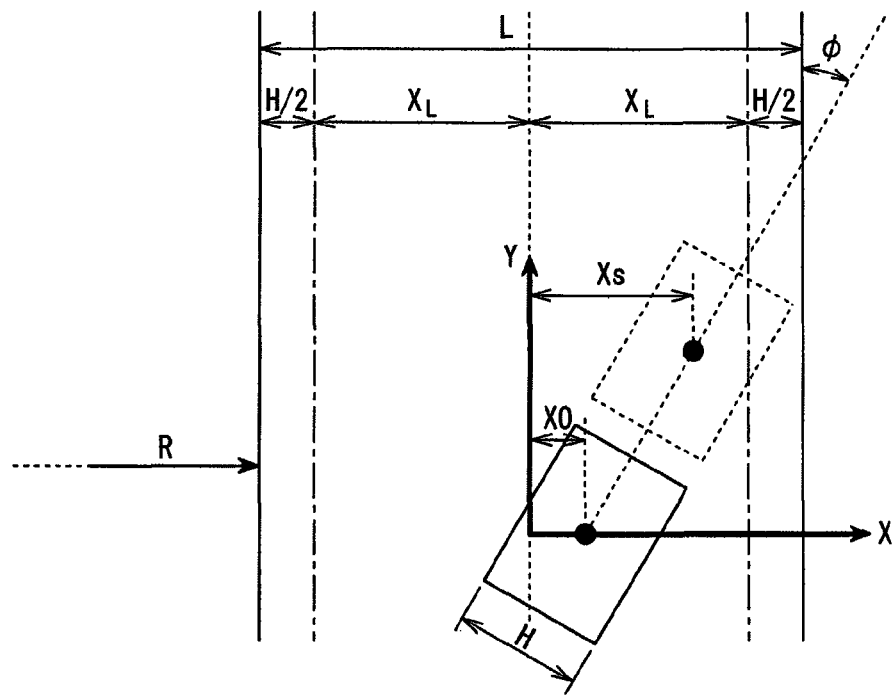
FIG. 3 is a schematic diagram for explaining the estimated lateral displacement Xs and the departure tendency determination threshold value $X_L$.

Although FIG. 3 depicts the departure tendency determination threshold value $X_L$ as being set within the lane in which the host vehicle is traveling, the invention is not limited to such an arrangement and it is acceptable for the threshold value $X_L$ to be set outside the lane. Furthermore, the invention is not limited to determining the departure tendency before the host vehicle departs from the lane. For example, the departure tendency determination threshold value $X_L$ can be set such that the host vehicle is determined to be in a departure tendency after at least one wheel has departed from the lane.

If the condition expressed by the equation (6) below is satisfied, the braking/driving force controller 8 determines that the host vehicle is in a lane departure tendency (or that degree of the lane departure tendency is high) and sets the value of a departure determination flag Fout to ON (Fout=ON).

$$|Xs| \geq X_L \quad (6)$$

If the condition expressed by the equation (7) below is satisfied, the braking/driving force controller 8 determines that the host vehicle is not in a lane departure tendency (or that the degree of the lane departure tendency is low) and sets the value of a departure determination flag Fout to OFF (Fout=OFF).

$$|Xs| < X_L \quad (7)$$

A departure direction Dout is also determined based on the lateral displacement X. More specifically, the departure direction Dout is set to left (Dout=left) if the lateral displacement is leftward from the middle of the lane and the departure direction Dout is set to right (Dout=right) if the lateral displacement is rightward from the middle of the lane. Thus, step S5 constitutes a lane departure tendency detection section that is configured to detect a degree of a lane departure tendency of a host vehicle exhibiting a tendency of departing from its driving lane.

In step S6, the braking/driving force controller 8 determines if the driver intends to change lanes. More specifically, the braking/driving force controller 8 accomplishes the determination regarding the driver's intent to change lanes based on the directional switch signal and steering angle δ obtained in step S1.

If the direction indicated by the directional switch signal (i.e., the side on which the turn signal flashes) and the direction indicated by the lane departure direction Dout obtained in step S5 are the same, then the braking/driving force controller 8 determines that the driver is intentionally changing lanes and changes the value of the departure determination flag Fout to OFF (Fout=OFF). In other words, it changes the result of the lane departure tendency determination to indicate that the host vehicle is not in a lane departure tendency.

If the direction indicated by the directional switch signal (i.e., the side on which the turn signal flashes) and the direction indicated by the lane departure direction Dout obtained in step S5 are different, then the braking/driving force controller 8 determines that the driver is not intentionally changing lanes and keeps the value of the departure determination flag Fout at ON (Fout=ON). In other words, it keeps the lane departure tendency determination result indicating that the host vehicle is in a lane departure tendency.

If the directional switch 20 is not being operated, the braking/driving force controller 8 determines the driver's intent regarding changing lanes based on the steering angle δ. If the driver is steering in the departure direction and the steering angle δ and a steering angle change amount (amount of change per unit time) Δδ are both equal to or larger than respective set values, then the braking/driving force controller 8 determines that the driver is changing lanes intentionally and changes the value of the departure determination flat Fout to OFF (Fout=OFF).

It is also acceptable to determine the driver's intent based on a steering torque.

In this way, when the value of the departure determination flag Fout is ON and it is determined that the driver is not changing lanes intentionally, the departure determination flag Fout is maintained at the value ON.

In step S7, if the value of the departure determination flag Fout is ON, then the braking/driving force controller 8 issues a sound output or a visual indicator output as an alarm to urge the driver to take action to avoid departing the lane.

As will be explained later, when the departure determination flag Fout turns ON, a yaw moment starts being applied to the host vehicle in accordance with a lane departure prevention control. The alarm is issued simultaneously with the application of the yaw moment. However, the timing at which the alarm is issued is not limited to occurring simultaneously with the yaw moment. For example, it is acceptable for the alarm to be issued before the yaw moment application starts.

In step S8, the braking/driving force controller 8 determines if it will execute a deceleration control contrived to decelerate the host vehicle in order to prevent the host vehicle from departing from the lane (hereinafter called "lane departure prevention deceleration control"). More specifically, the braking/driving force controller 8 determines if the value obtained by subtracting the lateral displacement limit distance $X_L$ from the estimated lateral displacement Xs calculated in step S5 ($|Xs|-X_L$) is equal to or larger than a deceleration control determination threshold value $X_\beta$.

Figure 4:
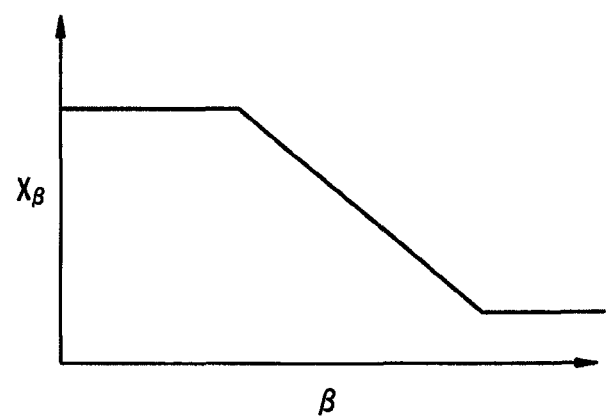
FIG. 4 is a characteristic plot of the deceleration control determination threshold value $X_\beta$ versus the lane curvature $\beta$.

The deceleration control determination threshold value $X_\beta$ is a value set based on the lane curvature β in accordance with a relationship like that illustrated in FIG. 4. As shown in FIG. 4, the deceleration control determination threshold value $X_\beta$ is held constant at a large value when the lane curvature β is small, decreases as the lane curvature β increases within a certain range of lane curvatures β, and is held constant at a small value when the lane curvature β is larger than a certain value.

If the aforementioned difference ($|Xs|-X_L$) is equal to or larger than the deceleration control determination threshold value $X_\beta$ (i.e., if $|Xs|-X_L \geq X_\beta$), then the braking/driving force controller 8 determines that it will execute deceleration control and sets the value of a deceleration control execution determination flag Fgs to ON. If the aforementioned difference ($|Xs|-X_L$) is smaller than the deceleration control determination threshold value $X_\beta$ (i.e., if $|Xs|-X_L < X_\beta$), then the braking/driving force controller 8 determines that it will not execute deceleration control and sets the value of the deceleration control execution determination flag Fgs to OFF.

The value of the departure determination flag Fout is set to ON in step S5 if the estimated lateral displacement Xs is equal to or larger than the departure tendency determination threshold value $X_L$ ($|Xs| \geq X_L$). Meanwhile, the value of the deceleration control execution determination flag Fgs is set to ON in step S8 if the aforementioned difference value ($|Xs|-X_L$) is equal to or larger than the deceleration control determination threshold value $X_\beta$. However, due to the interrelationships of the values used to set the flags, whenever the departure determination flag Fout is set to ON in step S5, that setting occurs after the deceleration control execution determination flag Fgs has been set to ON. Thus, the application of a yaw moment against the host vehicle that occurs when the departure determination flag Fout is turned ON occurs after deceleration control has been executed against the host vehicle.

In step S9, the braking/driving force controller 8 calculates a base yaw moment (base target yaw moment $M_1$) to be applied against the host vehicle as a lane departure prevention control. Thus, step S9 constitutes yaw moment calculating section that is configured to calculate a base yaw moment to be applied to the host vehicle based on the degree of the lane departure tendency determined by the lane departure tendency detection section.

More specifically, the base yaw moment $M_1$ is calculated using the equation (8) below based on the estimated lateral displacement Xs calculated in step S3 and the lateral displacement limit distance $X_L$.

$$M_1 = K1 \times K2(|Xs|-X_L) \quad (8)$$

Figure 5:
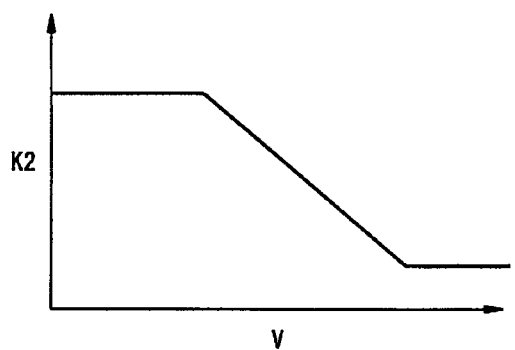
FIG. 5 is a characteristic plot of the gain K2 versus the host vehicle speed V.

In the equation above, the term K1 is a proportional gain determined based on the specifications of the host vehicle and the term K2 is gain that varies in accordance with the host vehicle speed V. FIG. 5 illustrates an example of how the gain K2 is set. As shown in FIG. 5, the gain K2 is held constant at a large value when the host vehicle speed V is in a low speed region, decreases as the host vehicle speed V increases within a certain range of vehicle speeds V, and is held constant at a small value when the host vehicle speed V is larger than a certain value.

With the equation (8) above, the base yaw moment $M_1$ increases as the difference between the estimated lateral displacement Xs and the lateral displacement limit distance $X_L$ increases.

In step S10, the departure angle Φt calculated in step S3 is used in the equation (9) shown below to calculate a gain gt for calculating an initial control time period Tc in step S11 (explained later).

$$gt = f_2(\Phi t) \quad (9)$$

Figure 6:
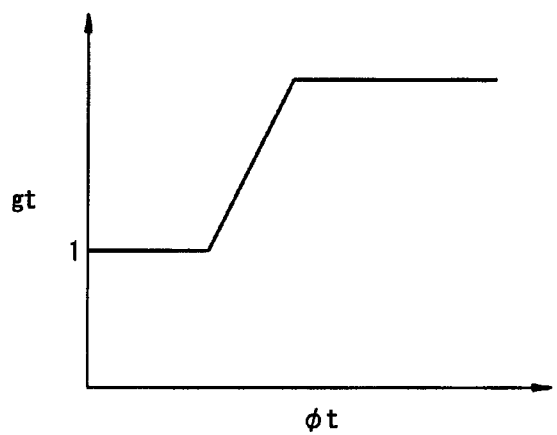
FIG. 6 is a characteristic plot of the gain gt versus the departure angle $\Phi t$.

In the equation above, the function f2 is a function for obtaining the gain gt based on the departure angle Φt. FIG. 6 shows an example of the characteristic described by the function f2. As shown in FIG. 6, the function f2 is contrived such that the gain gt is held constant at a small value when the departure angle Φt is below a certain value, increases as the departure angle Φt increases within a certain range of departure angles Φt, and is held constant at a large value when the departure angle Φt larger than a certain value.

In step S11, the braking/driving force controller 8 calculates the initial control time period Tc using the equation (10) shown below based on the gain gt calculated in step $$Tc = gt \times T0 \quad (10)$$

In the equation above, the term T0 is a default value of the initial control time period Tc.

Based on the relationship between the equations (9) and (10), the initial control time period Tc increases (lengthens) as the departure angle Φt increases.

In step S12, the braking/driving force controller 8 sets a minimum value (first prescribed minimum yaw moment) for the target yaw moment to be used for applying a yaw moment to the host vehicle as a lane departure prevention control (hereinafter called "minimum target yaw moment"). More specifically, the minimum target yaw moment $M_{min}$ is set using either the equation (11) or the equation (12) depending on the value of the initial control time period Tc.

$$\text{If } Ti < Tc, \text{ then } M_{min} = M_{min1} \quad (11)$$

$$\text{If } Ti \geq Tc, \text{ then } M_{min} = M_{min2} \quad (12)$$

In the equations above, the term Ti is the amount of time that has elapsed since the lane departure prevention control started (i.e., since the departure determination flag Fout was set to ON). Meanwhile, the term $M_{min1}$ and $M_{min2}$ are a first prescribed minimum target yaw moment and a second prescribed target minimum yaw moment, respectively. The first minimum target yaw moment $M_{min1}$ and the initial control time period Tc are set to such values that the alertness (alertness degree) of the driver can be heightened by applying the first minimum target yaw moment $M_{min1}$ to the host vehicle. The first minimum target yaw moment $M_{min1}$ is larger than the second minimum target yaw moment $M_{min2}$ ($M_{min1} > M_{min2}$). By applying the second minimum yaw moment $M_{min2}$, the driver can be made aware in a sensory manner that a reliable control has been executed without ending the departure prevention control abruptly. The minimum target yaw moments $M_{min1}$ and $M_{min2}$ and the initial control time period Tc are determined experimentally or based on experience.

In step S13, the braking/driving force controller 8 calculates a gain gr to be used in step S14 using the equation (13) shown below based on the road state index value N.

$$gr = f_3(N) \quad (13)$$

The function $f_3$ is a function for obtaining the gain gr based on the road state index value N and is contrived, for example, such that the gain gr increases as the road state index value increases. Thus, based on the relationship with respect to the previously presented equation (3), the gain gr increases as the roughness degree of the road increases.

In step S14, the braking/driving force controller 8 compares the base yaw moment $M_1$ calculated in step S9 to the minimum target yaw moment $M_{min}$ set in step S12, i.e., uses the minimum target yaw moment $M_{min}$ as a threshold value to determine the size of the base yaw moment $M_1$. The braking/driving force controller 8 then calculates a corrected yaw moment $M_2$ using either the equation (14) or the equation (15) shown below depending on the comparison result (determination result).

$$\text{If } M_1 \geq M_{min}, \text{ then } M_2 = M_1 \quad (14)$$

$$\text{If } M_1 < M_{min}, \text{ then } M_2 = gr \times M_{min} \quad (15)$$

In the equation (14), gr is a gain for revising the minimum target yaw moment $M_{min}$ set in step S13 (equation (13)). With the equations (14) and (15), the corrected yaw moment $M_2$ is set to a value that is at least as large as the minimum target yaw moment $M_{min}$ (i.e., to $M_1$ if $M_1 \geq M_{min}$ or to $gr \times M_{min}$ if $M_1 < M_{min}$).

Due to the relationship between the equations (13) and (15), when the base yaw moment $M_1$ is smaller than the minimum target yaw moment $M_{min}$, the corrected yaw moment $M_2$ (>$M_1$) increases as the road state index value N increases.

In step S15, the braking/driving force controller 8 calculates a final target yaw moment Ms. More specifically, the braking/driving force controller 8 calculates a final target yaw moment Ms(0) for the current control cycle using the equation (16) shown below based on the corrected yaw moment $M_2$ calculated in step S14 and the final target yaw moment Ms(−1) calculated in the previous control cycle (one cycle prior).

$$Ms(0) = f_4(M_2, Ms(-1)) \quad (16)$$

The function $f_4$ is a function for combining the corrected yaw moment $M_2$ of the current control cycle to the target yaw moment Ms(−1) calculated in the previous control cycle in a continuous manner (linear or smooth curve relationship).

The target yaw moment Ms(0) is set as just described when the departure determination flag Fout is ON, and the target yaw moment Ms(0) is set to 0 when the departure determination flag Fout is OFF.

In step S16, the braking/driving force controller 8 calculates a deceleration rate for the lane departure prevention deceleration control. In other words, the braking/driving force controller 8 calculates braking forces to be applied to both left and right wheels for the purpose of decelerating the host vehicle. In this embodiment, the braking forces are calculated as target brake fluid pressures Pgf and Pgr. The target brake fluid pressure Pgf for the front wheels is calculated using the equation (17) below based on the estimated lateral displacement Xs calculated in step S4, the lateral displacement limit distance $X_L$, and the deceleration control determination threshold value $X_\beta$ obtained in step S8.

$$Pgf = Kgv \times Kgx(|Xs| - X_L - X_\beta) \quad (17)$$

Figure 7:
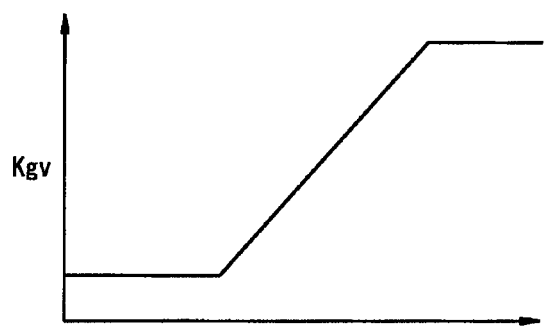
FIG. 7 is a characteristic plot of conversion coefficient Kgv versus the host vehicle speed V.

In the equation above, Kgv is a conversion coefficient set in accordance with the host vehicle speed V and Kgx is a conversion coefficient determined based on the specifications of the host vehicle. FIG. 7 illustrates an example of how the conversion coefficient Kgv is set. As shown in FIG. 7, the conversion coefficient Kgv is held constant at a small value when the host vehicle speed V is in a low speed region, increases as the host vehicle speed V increases within a certain range of vehicle speeds V, and is held constant at a large value when the host vehicle speed V larger than a certain value.

After the target brake fluid pressure Pgf for the front wheels is calculated, the target brake fluid pressure Pgr for the rear wheels is calculated based on the target braking fluid pressure Pgf and a consideration of the distribution of braking force between the front and rear wheels.

In this way, in step S16, a deceleration rate (more specifically, target brake fluid pressures Pgf and Pgr) for avoiding lane departure is obtained.

In step S17, the braking/driving force controller 8 calculates a target brake fluid pressure for each wheel. The final brake fluid pressure is calculated based on whether or not braking control is being executed for lane departure prevention. More specifically, method of calculating the final brake fluid pressure will now be explained in more detail.

If the departure determining flag Fout is OFF, i.e., if it is determined that there is no lane departure tendency, then the target brake fluid pressure Psi (i=fl, fr, rl, rr) for each wheel is calculated as Pmf or Pmr as shown in the equations (18) and (19) below.

$$Psfl = Psfr = Pmf \quad (18)$$

$$Psrl = Psrr = Pmr \quad (19)$$

Here, the term Pmf is the brake fluid pressure for the front wheels. Pmr is the brake fluid pressure for the rear wheels and is calculated based on the brake fluid pressure Pmf for the front wheels in consideration of the distribution between the front and rear wheels. For example, if the driver is operating the brakes, the brake fluid pressures Pmf and Pmr will be values set in accordance with the brake actuation amount.

Meanwhile, if the departure determination flag Fout is ON, i.e., if it is determined that a lane departure tendency exists, then first a front wheel target brake fluid pressure difference ΔPsf and a rear wheel target brake fluid pressure difference ΔPsr are calculated based on the target yaw moment Ms (i.e., the target yaw moment Ms(0) of the current control cycle). The target brake fluid pressure differences ΔPsf and ΔPsr are calculated using the equations (20) to (23) shown below.

If $|Ms| < Ms_1$, then $$\Delta Psf = 0 \quad (20)$$

$$\Delta Psr = Kbr \times Ms/L_{TR} \quad (21)$$

If $|Ms| \geq Ms_1$, then $$\Delta Psf = Kbf \times (Ms/|Ms|) \times (|Ms| - Ms_1)/L_{TR} \quad (22)$$

$$\Delta Psr = Kbr \times (Ms/|Ms|) \times (|Ms| - Ms_1)/L_{TR} \quad (23)$$

In the equations above, the term $Ms_1$ is a threshold value for determining which equations to use. The tread $L_{TR}$ is set to the same value for the front and rear wheels for convenience. The terms Kbf and Kbr are conversion coefficients for converting a braking force into a brake fluid pressure for the front and rear wheels and are determined based on the brake specifications.

Thus, the braking forces exerted against the wheels are distributed in accordance with the magnitude of the target yaw moment Ms. More specifically, if the target yaw moment Ms is smaller than the threshold value $Ms_1$, then the front wheel target brake fluid pressure difference ΔPsf is set to 0 and the rear wheel target brake fluid pressure difference ΔPsr is set to a prescribed value such that a braking force difference is generated between the left and right rear wheels. If the target yaw moment Ms is equal to or larger than the threshold value $Ms_1$, then the target brake fluid pressure differences ΔPsf and ΔPsr are each set to a prescribed value such that braking force differences are generated between the left and right wheels of the front and the rear.

The final target brake fluid pressure Psi (i=fl, fr, rl, rr) for each wheel is then calculated using the target brake fluid pressure differences ΔPsf and ΔPsr (calculated as just described) and the target brake fluid pressures Pgf and Pgr for deceleration. More particularly, the final target brake fluid pressures Psi (i=fl, fr, rl, rr) for the wheels are also calculated in accordance with the value of the deceleration control execution determination flag Fgs set in step S8.

If the departure determination flag Fout is ON (i.e., if it has been determined that the host vehicle is in a lane departure tendency) but the deceleration control execution determination flag Fgs is OFF (i.e., only a yaw moment is being applied to the host vehicle), then the target brake fluid pressures Psi (I=fl, fr, rl, rr) of the wheels are calculated using the equations (24) shown below.

$$Psfl=Pmf$$

$$Psfr=Pmf+\Delta Psf$$

$$Psrl=Pmr$$

$$Psrr=Pmr+\Delta Psr \quad (24)$$

Meanwhile, if the departure determination flag Fout is ON and the deceleration control execution determination flag Fgs is ON (i.e., if the host vehicle is being decelerated while a yaw moment is being applied to the host vehicle), then the target brake fluid pressures Psi (i=fl, fr, rl, rr) of the wheels are calculated using the equations (25) shown below.

$$Psfl=Pmf+Pgf/2$$

$$Psfr=Pmf+\Delta Psf+Pgf/2$$

$$Psrl=Pmr+Pgr/2$$

$$Psrr=Pmr+\Delta Psr+Pgr/2 \quad (25)$$

Thus, with the equations (24) and (25), the target brake fluid pressures Psi (i=fl, fr, rl, rr) of the wheels are calculated such that the operation of the brakes by the driver, i.e., the brake fluid pressures Pmf and Pmr, are taken into account. The braking/driving force controller 8 sends the calculated target brake fluid pressures Psi (i=fl, fr, rl, rr) of the wheels to the brake fluid pressure controller 7 as brake fluid pressure command values.

The equations (20) to (25) for calculating the target brake fluid pressures of the wheels are for a situation in which the departure direction Dout is the leftward direction (Dout=left), i.e., a situation in which the host vehicle is exhibiting a lane departure tendency with respect to a left-hand lane. An explanation of equations that correspond to the equations (20) to (25) and apply to a situation in which the departure direction Dout is the rightward direction (Dout=right), i.e., a situation in which the host vehicle is exhibiting a lane departure tendency with respect to a right-hand lane, is omitted here for the sake of brevity. When the departure direction Dout is the rightward direction (Dout=right), the target brake fluid pressures Psi (i=fl, fr, rl, rr) of the wheels are calculated using the equations (26) shown below, which correspond to the equations (24) presented above.

$$Psfl=Pmf+\Delta Psf$$

$$Psfr=Pmf$$

$$Psrl=Pmr+\Delta Psr$$

$$Psrr=Pmr \quad (26)$$

Thus, step S17 constitutes a yaw moment control section that is configured to apply the base yaw moment $M_1$ calculated by the yaw moment calculating section to the host vehicle when the base yaw moment is equal to or larger than a first prescribed minimum yaw moment $M_{min1}$, which is greater than zero, and to apply the first prescribed minimum yaw moment $M_{min1}$ to the host vehicle if the base yaw moment $M_1$ is smaller than the first prescribed minimum yaw moment $M_{min1}$.

The operation of the embodiment will now be explained.

While the host vehicle is traveling, various data are read from the sensors, controllers, and controllers (step S1) and the host vehicle speed V is calculated (step S2). Then, the lane departure tendency is determined (i.e., the value of the departure determination flag Fout is set) based on the estimated future lateral displacement (departure estimate value) Xs (step S5) and the lane departure determination result (the value of the departure determination flag Fout) is corrected based on whether or not the driver is exhibiting an intent to change lanes (step S6). An alarm output is issued based on the corrected lane departure determination result (step S7).

The value of the deceleration control execution determination flag Fgs is set based on a comparison of a deceleration control determination threshold value $X_\beta$ with the value ($|Xs|-X_L$) obtained by subtracting a departure tendency determination threshold value $X_L$ from the estimated lateral displacement Xs (step S8), and a deceleration rate (target brake fluid pressure Pgf) is calculated for decelerating the host vehicle as a lane departure prevention control (step S16).

The departure angle Φt of the host vehicle is calculated (step S3), a gain gt is calculated based on the calculated departure angle Φt (step S10), an initial control time period Tc is calculated based on the gain gt (step S11), and a minimum target yaw moment $M_{min}$ is set in accordance with the initial control time period Tc (step S112). A road state index value N indicating the roughness of the road is calculated (step S4), and a gain gr is calculated based on the road state index value N (step S13). A base yaw moment (base target yaw moment) $M_1$ is also calculated (step S9). A corrected yaw moment $M_2$ is calculated based on a comparison of the minimum target yaw moment $M_{min}$ and the base yaw moment $M_1$ (step S14), and a current target yaw moment Ms(0) is calculated using the corrected yaw moment $M_2$ and the target yaw moment Ms(−1) calculated in the previous control cycle (one cycle prior).

The target brake fluid pressures Psi (i=fi, fr, rl, rr) of the wheels are calculated based on the statuses of the departure determination flag Fout and the deceleration control execution determination flag Fgs and the values of the target yaw moment Ms (target yaw moment Ms(0)) and the deceleration (target brake fluid pressure Pgf), and the calculated target brake fluid pressures Psi (i=fl, fr, rl, rr) are sent to the brake fluid pressure controller 7 (step S16). As a result, a yaw moment is applied to the host vehicle in accordance with the lane departure tendency of the host vehicle and, depending on the situation, the host vehicle is also decelerated.

The operational effects of the embodiment will now be explained.

The base yaw moment $M_1$ is calculated based on the estimated lateral displacement Xs and the lateral displacement limit distance $X_L$, the minimum target yaw moment $M_{min}$ is set to either a first minimum yaw moment $M_{min1}$ or a second minimum target yaw moment $M_{min2}$ based on the initial control time period Tc, and the corrected yaw moment $M_2$ is set to a value that is at least as large as the minimum target yaw moment $M_{min}$ (i.e., to $Ms_1$ ($\geq M_{min}$) or to $gr \times M_{min}$) (step S14).

The base yaw moment $M_1$ is set as the corrected yaw moment $M_2$ if the base yaw moment $M_1$ is larger than the minimum target yaw moment $M_{min}$.

As a result, the yaw moment that is applied to the host vehicle, i.e., the corrected yaw moment $M_2$ (more specifically, the target yaw moment Ms(0)), is at least as large as the minimum target yaw moment $M_{min}$. If the yaw moment applied to the host vehicle is larger, then the avoidance of lane departure can be completed earlier, i.e., the lane departure prevention control can be completed earlier. As a result, the period of time during which the yaw moment is applied can be shortened and the magnitude of the yaw moment applied to the host vehicle can be maintained at a prescribed magnitude.

By applying a yaw moment of a prescribed magnitude to the host vehicle, the lane departure can be prevented and the driver can be informed (through the change in vehicle behavior resulting from the application of the yaw moment) that the possibility of the host vehicle departing from the lane is high.

For example, when the degree of the lane departure tendency (the estimated lateral displacement Xs) is small and the yaw moment that would be applied to the host vehicle if the yaw moment were calculated solely based on the degree of the lane departure tendency is small, the driver can be still informed that the possibility of the host vehicle departing from the lane is high because a yaw moment of a prescribed magnitude is applied to the host vehicle.

Meanwhile, if the base yaw moment $M_1$ calculated based on the estimated lateral displacement Xs and the lateral displacement limit distance $X_L$ is larger than the minimum target moment $M_{min}$, then the corrected yaw moment $M_2$ is set to the base yaw moment $M_1$. As a result, the driver can be informed that the possibility of the host vehicle departing from the lane is high and a yaw moment that is sufficiently large to reliably prevent the lane departure can be secured.

As explained previously, if the base yaw moment $M_1$ is smaller than the minimum yaw moment $M_{min}$, then the corrected yaw moment $M_2$ is calculated as the mathematical product of the minimum target yaw moment $M_{min}$ and the gain gr (see the previously presented equation (15)). Since the gain gr increases as the road roughness increases, the corrected yaw moment $M_2$ increases as the roughness degree of the road increases. As the roughness degree of the road increases, it becomes more difficult for the driver to recognize a change in vehicle behavior resulting from the application of a yaw moment, and thus more difficult to inform the driver that the possibility that the host vehicle will depart from the lane is high. Since the corrected yaw moment $M_2$ (more specifically, the target yaw moment Ms(0)) increases as the roughness degree of the road increases, even when the roughness degree of the road is high, the driver can be informed through a change in vehicle behavior resulting from the application of a yaw moment that the possibility of the host vehicle departing from the lane is high.

Calculating the corrected yaw moment $M_2$ as the product of the minimum target yaw moment $M_{min}$ and the gain gr is equivalent to calculating the corrected yaw moment $M_2$ based on a minimum target yaw moment $M_{min}$ that increases as the gain gr increases, i.e., as the roughness degree of the road increases (where the minimum target yaw moment $M_{min}$ is equivalent to a threshold value for the base yaw moment $M_1$).

As described previously, the minimum target yaw moment $M_{min}$ is set in accordance with the initial control time period Tc (step S12). More specifically, the minimum target yaw moment $M_{min}$ is set to a first minimum target yaw moment $M_{min1}$ during the initial control time period Tc (Ti<Tc) and to a second minimum target yaw moment $M_{min2}$ that is smaller than the first minimum target yaw moment $M_{min1}$ after the initial control time period Tc has elapsed (Ti≥Tc). As a result, the corrected yaw moment $M_2$ is set to a value at least as large as the first minimum target yaw moment $M_{min1}$ (i.e., to $Ms_1$ (≥$M_{min1}$) or to gr×$M_{min1}$) during the initial control time period Tc (Ti<Tc) and to a value at least as large as the second minimum target yaw moment $M_{min2}$ (i.e., to $Ms_1$ (>$M_{min2}$) or to gr×$M_{min2}$) after the initial control time period Tc has elapsed (Ti=Tc) (step S14).

Figure 8:
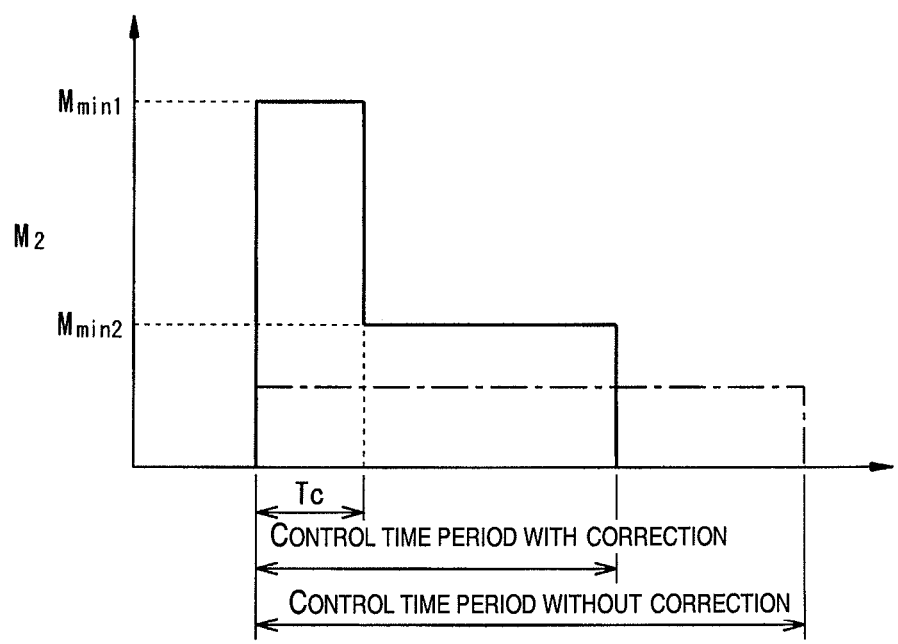
FIG. 8 is a characteristic plot showing how the corrected yaw moment $M_2$ changes with time.

FIG. 8 illustrates an example of how the corrected yaw moment $M_2$ is set.

For example, if the base yaw moment $M_1$ remains below the minimum target yaw moment $M_{min}$ during the lane departure prevention control such that the equation (15) is used, then, as shown in FIG. 8, then the corrected yaw moment $M_2$ is set to the first minimum target yaw moment $M_{min1}$ (i.e., the value gr×$M_{min1}$) during the initial control time period Tc (Ti<Tc) and set to the second minimum target yaw moment $M_{min2}$ (i.e., the value gr×$M_{min2}$) during the period from when the initial control time period Tc ends (Ti≥Tc) until the lane departure prevention control ends. Thus, the yaw moment applied to the host vehicle changes in two stages and the driver can be made aware that the possibility of the host vehicle departing from the lane is high through the change in vehicle behavior that results from the application of the yaw moment.

The present invention is not limited to changing the applied yaw moment in two stages as shown in FIG. 8. It is also acceptable to change the yaw moment in three or more stages or to apply the yaw moment in only one stage by using the first minimum target yaw moment $M_{min1}$ during the initial control time period Tc only.

As indicated in FIG. 8, the control time period (execution period) of a lane departure prevention control in accordance with the present embodiment is shorter than the control time period of a lane departure prevention control that is not in accordance with the present embodiment (i.e., that does not correct the yaw moment to a larger value). This difference occurs because the present embodiment reduces the degree of the departure tendency at an earlier timing by using a larger yaw moment $M_{min1}$ in the initial stage.

Additionally, as described previously, the initial control time period Tc is set such that the larger the departure angle Φt is, the larger the value to which the initial control time period Tc is set (steps S10 and S11). Thus, the larger the departure angle Φt is, the longer the time period during which the corrected yaw moment $M_2$ is set to a value at least as large as the first minimum target yaw moment $M_{min1}$. As a result, the period of time during which a large yaw moment is applied to the host vehicle is increased and the driver can be reliably informed that the possibility of the host vehicle departing from the lane is high.

Figure 9:
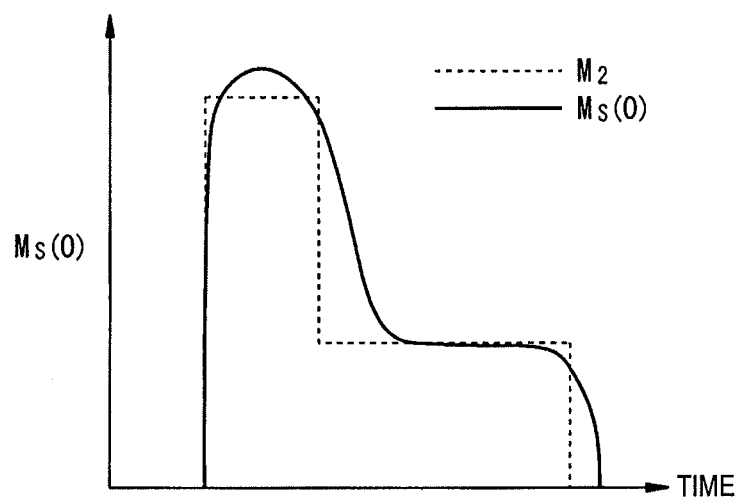
FIG. 9 is a characteristic plot showing how the target yaw moment Ms(0) changes with time.

As described previously, the final target yaw moment Ms(0) of the current control cycle is calculated (in step S15) such that the corrected yaw moment $M_2$ of the current control cycle is joined to the target yaw moment Ms(−1) calculated in the previous control cycle in a continuous manner (linear or smooth curve relationship). As a result, the target yaw moment Ms(0) varies in a smooth manner, as indicated with the solid-line curve in FIG. 9.

A variation (modification) of the previously described embodiment will now be explained.

Although the previous embodiment is contrived to vary the minimum target yaw moment $M_{min}$ in accordance with the roughness degree of the road on which the host vehicle is traveling, it is also feasible to vary the minimum target yaw moment $M_{min}$ in accordance with the alertness (alertness degree) of the driver. More specifically, the minimum target yaw moment $M_{min}$ can be increased as the alertness of the driver decreases, i.e., the corrected yaw moment $M_2$ can be increased as the alertness of the driver decreases. With such a configuration, the lower the alertness of the driver becomes, the larger the yaw moment applied to the host vehicle becomes and, thus, the driver can be made aware that the possibility of the host vehicle departing from the lane is high even if the driver is in a state of low alertness.

In this variation, the host vehicle is provided with an alertness degree detecting unit 31 as shown in FIG. 1. The alertness degree detecting unit 31 comprises a contrivance that serves to detect (estimate) the alertness degree of the driver based on changes in the steering torque applied to the steering wheel and a condition of the driver (e.g., a blinking rate of the eyes of the driver or the degree of a vertical motion of the head of the driver) photographed by a camera in the cabin of the host vehicle. Thus, the alertness degree detecting unit 31 constitutes a driver alertness detecting section that is configured to detect an alertness degree of a driver. The yaw moment control section (step S17 is thus modified to correct the first prescribed minimum yaw moment to a larger value as the alertness degree of the driver becomes smaller.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A lane departure prevention system comprising:

a lane departure tendency detection section configured to detect a degree of a lane departure tendency of a host vehicle exhibiting a tendency of departing from its driving lane;

a yaw moment calculating section configured to calculate a base yaw moment to be applied to the host vehicle based on the degree of the lane departure tendency determined by the lane departure tendency detection section; and a yaw moment control section configured to apply the base yaw moment calculated by the yaw moment calculating section to the host vehicle while the base yaw moment is calculated as being equal to or larger than a first prescribed minimum yaw moment, the first prescribed minimum yaw moment being greater than zero, and the yaw moment control section being further configured to apply the first prescribed minimum yaw moment to the host vehicle if the base yaw moment is smaller than the first prescribed minimum yaw moment.

2. The lane departure prevention system recited in claim 1, wherein the yaw moment control section is configured to restrict an amount of time that the first prescribed minimum yaw moment is applied to a prescribed control time period when the first prescribed minimum yaw moment is being applied.

3. A lane departure prevention system comprising:

a lane departure tendency detection section configured to detect a degree of a lane departure tendency of a host vehicle exhibiting a tendency of departing from its driving lane;

a yaw moment calculating section configured to calculate a base yaw moment to be applied to the host vehicle based on the degree of the lane departure tendency determined by the lane departure tendency detection section; and a yaw moment control section configured to apply the base yaw moment calculated by the yaw moment calculating section to the host vehicle while the base yaw moment is calculated as being equal to or larger than a first prescribed minimum yaw moment, the first prescribed minimum yaw moment being greater than zero, and the yaw moment control section being further configured to apply the first prescribed minimum yaw moment to the host vehicle if the base yaw moment is smaller than the first prescribed minimum yaw moment, the yaw moment control section being configured to restrict an amount of time that the first prescribed minimum yaw moment is applied to a prescribed control time period when the first prescribed minimum yaw moment is being applied, and the yaw moment control section being configured to apply a second prescribed minimum yaw moment that is smaller than the first prescribed minimum yaw moment and greater than zero when the prescribed control time period has elapsed and the base yaw moment calculated by the yaw moment calculating section is smaller than the second prescribed minimum yaw moment.

4. The lane departure prevention system recited in claim 2, wherein
the yaw moment control section is configured to increase an amount of time of the prescribed control time period as the degree of the lane departure tendency becomes greater.

5. The lane departure prevention system recited in claim 1, further comprising
a road surface roughness detecting section configured to detect a roughness degree of a road on which the host vehicle is traveling,
the yaw moment control section being configured to correct the first prescribed minimum yaw moment to a larger value as the roughness degree becomes greater.

6. The lane departure prevention system recited in claim 1, further comprising
a driver alertness detecting section configured to detect an alertness degree of a driver,
the yaw moment control section being configured to correct the first prescribed minimum yaw moment to a larger value as the alertness degree of the driver becomes smaller.

7. A lane departure prevention method comprising:
detecting a degree of a lane departure tendency of a host vehicle exhibiting a tendency of departing from tis driving lane;
calculating, using a controller, a base yaw moment to be applied to the host vehicle based on the degree of the lane departure tendency that was determined; and
selectively applying the base yaw moment to the host vehicle while the base yaw moment is calculated as being equal to or larger than a first prescribed minimum yaw moment, the first prescribed minimum yaw moment being greater than zero; and
selectively applying the first predetermined minimum yaw moment to the host vehicle if the base yaw moment is smaller than the first prescribed minimum yaw moment.

* * * * *